(12) United States Patent
Hill et al.

(10) Patent No.: US 11,804,046 B2
(45) Date of Patent: Oct. 31, 2023

(54) SYSTEMS AND METHODS FOR EFFICIENT INFORMATION EXTRACTION IN TRAFFIC MONITORING

(71) Applicant: Rekor Systems, Inc., Columbia, MD (US)

(72) Inventors: Matthew Anthony Hill, Sanford, NC (US); Alexandros Konstantinos Kouparoulis, Columbia, MD (US); Christopher Allen Kadoch, Leesburg, VA (US)

(73) Assignee: Rekor Systems, Inc., Columbia, MD (US)

( * ) Notice: Subject to any disclaimer, the term of this patent is extended or adjusted under 35 U.S.C. 154(b) by 89 days.

(21) Appl. No.: 17/489,870

(22) Filed: Sep. 30, 2021

(65) Prior Publication Data
US 2022/0101017 A1    Mar. 31, 2022

Related U.S. Application Data

(60) Provisional application No. 63/085,793, filed on Sep. 30, 2020.

(51) Int. Cl.
*G06V 20/54*   (2022.01)
*G06V 10/20*   (2022.01)
*G06V 20/62*   (2022.01)

(52) U.S. Cl.
CPC ............ *G06V 20/54* (2022.01); *G06V 10/255* (2022.01); *G06V 20/63* (2022.01); *G06V 20/625* (2022.01); *G06V 2201/08* (2022.01)

(58) Field of Classification Search
CPC .... G06V 20/625; G06V 10/25; G06V 20/588; G06V 20/58; G06V 20/54; G06V 20/63;
(Continued)

(56) References Cited

U.S. PATENT DOCUMENTS 10,134,285  B1    11/2018   Isler et al.
10,754,893  B1 *  8/2020    Isler ................. G06F 16/787
(Continued)

FOREIGN PATENT DOCUMENTS

KR    10-0416252 B1    11/2002
KR    101625538 B1 *    6/2013
(Continued)

OTHER PUBLICATIONS

PCT/US21/71656, International Search Report (PCT/ISA/220 and PCT/ISA/210) dated Jan. 24, 2022, enclosing Written Opinion of the International Searching Authority (PCT/ISA/237) (Seven (7) pages).

(Continued)

*Primary Examiner* — Dung Hong
(74) *Attorney, Agent, or Firm* — Crowell & Moring LLP

(57) ABSTRACT

A surveillance device includes an imaging unit configured generate full-quality image data from a captured image of a vehicle, an image filtering module that converts the full-quality image data to reduced-quality image data. The surveillance device also includes a subsector module that processes the reduced-quality image data to generate subsector data defining one or more sub sectors of the captured image, and an image processing module that identifies one or more specific vehicle characteristics within the one or more subsectors by applying image recognition processing on the full-quality image data only within the one or more subsectors. The reduced quality image data is insufficient for the image recognition processing to identify specific vehicle characteristics therefrom.

20 Claims, 4 Drawing Sheets

(58) Field of Classification Search
CPC ...... G06V 20/53; G06V 20/584; G06V 10/26; G06V 10/462; G06V 20/62; G06V 10/803; G06V 40/161; G06V 10/255; G06V 2201/08
See application file for complete search history.

(56) References Cited

U.S. PATENT DOCUMENTS

| | | | | |
|---|---|---|---|---|
| 11,003,919 | B1 * | 5/2021 | Ghadiok | ................ H04N 23/90 |
| 11,527,057 | B2 * | 12/2022 | Chua | ................... G06F 18/2415 |
| 11,580,753 | B2 * | 2/2023 | Popov | .................... G06V 20/63 |
| 2008/0036875 | A1 * | 2/2008 | Jones | ..................... H04N 23/63 |
| | | | | 348/E7.086 |
| 2011/0128150 | A1 * | 6/2011 | Kanga | ................... H04N 7/188 |
| | | | | 340/541 |
| 2013/0088600 | A1 * | 4/2013 | Wu | ......................... H04N 7/18 |
| | | | | 348/149 |
| 2018/0082131 | A1 * | 3/2018 | Li | ........................ G06V 10/764 |
| 2018/0300578 | A1 * | 10/2018 | Wilbert | ................ G08G 1/0175 |

FOREIGN PATENT DOCUMENTS

| | | | |
|---|---|---|---|
| KR | 10-2013-0095480 A | | 8/2013 |
| KR | 20150092452 A | * | 8/2015 |
| KR | 20150132672 A | * | 11/2015 |
| KR | 101774735 B1 | * | 9/2017 |
| WO | WO-9966449 A1 | * | 12/1999 ........... G06T 3/4007 |

OTHER PUBLICATIONS

PCT/US2021/071656, International Preliminary Report on Patentability (PCT/IB/326 and PCT/IB/373) dated Apr. 13, 2023 (Six (6) pages).

* cited by examiner

SYSTEMS AND METHODS FOR EFFICIENT INFORMATION EXTRACTION IN TRAFFIC MONITORING

CROSS-REFERENCE TO RELATED APPLICATIONS

This application claims the benefit of U.S. Provisional Application No. 63/085,793, filed Sep. 30, 2020, the disclosures of which are expressly incorporated by reference herein.

BACKGROUND

The present invention relates to traffic monitoring systems and methods, and more particularly to methods for reducing the image processing loads in such systems.

In roadway video surveillance missions (e.g., license plate recognition, vehicle characteristics determination, traffic flow and vehicle counting, safety and congestion alerting, etc.) there is often the need to perform processor intensive computational processes at the surveillance device, where the processing capability may be limited. On the other hand, to increase the accuracy of detection, and to extract ever increasing types of information, the video surveillance devices are increasingly growing in resolution. This leads to a growing demand for processing power, as the higher resolution video means there is a higher processing load due to more pixels needing to be processed.

Traditional solutions include down sampling the image data, either by reducing the frame rate, reducing the color depth or reducing the total resolution. Image recognition is performed on the down sampled image data to extract the desired information for the surveillance mission. However, the down sampling reduces the information content within the image data, and results in a decreased performance of the image recognition and information extraction.

It is therefore desirable to provide a traffic monitoring system that reduces the processing load at the surveillance device while maintaining information extraction accuracy.

BRIEF SUMMARY OF THE INVENTION

Traffic monitoring systems and methods are disclosed for reducing the processing load at a surveillance device while maintaining information extraction accuracy. In at least one embodiment, a surveillance device can include an imaging unit that generates full-quality image data from a captured image of a vehicle. The surveillance device can also include an image filtering module configured to convert the full-quality image data to reduced-quality image data. The surveillance device can further include a subsector module that processes the reduced-quality image data to generate subsector data defining one or more subsectors of the captured image. The surveillance device can still further include an image processing module that identifies one or more specific vehicle characteristics within the one or more subsectors by applying image recognition processing on the full-quality image data only within the one or more subsectors. The reduced quality image data is preferably insufficient for the image recognition processing to identify specific vehicle characteristics therefrom. The processing load of the surveillance device can thereby be reduced while maintaining information extraction accuracy.

Other objects, advantages and novel features of the present invention will become apparent from the following detailed description of one or more preferred embodiments when considered in conjunction with the accompanying drawings. It should be recognized that the one or more examples in the disclosure are non-limiting examples and that the present invention is intended to encompass variations and equivalents of these examples.

BRIEF DESCRIPTION OF THE DRAWINGS

The features, objects, and advantages of the present invention will become more apparent from the detailed description, set forth below, when taken in conjunction with the drawings, in which like reference characters identify elements correspondingly throughout.

DETAILED DESCRIPTION OF THE PREFERRED EMBODIMENTS

Figure 1:
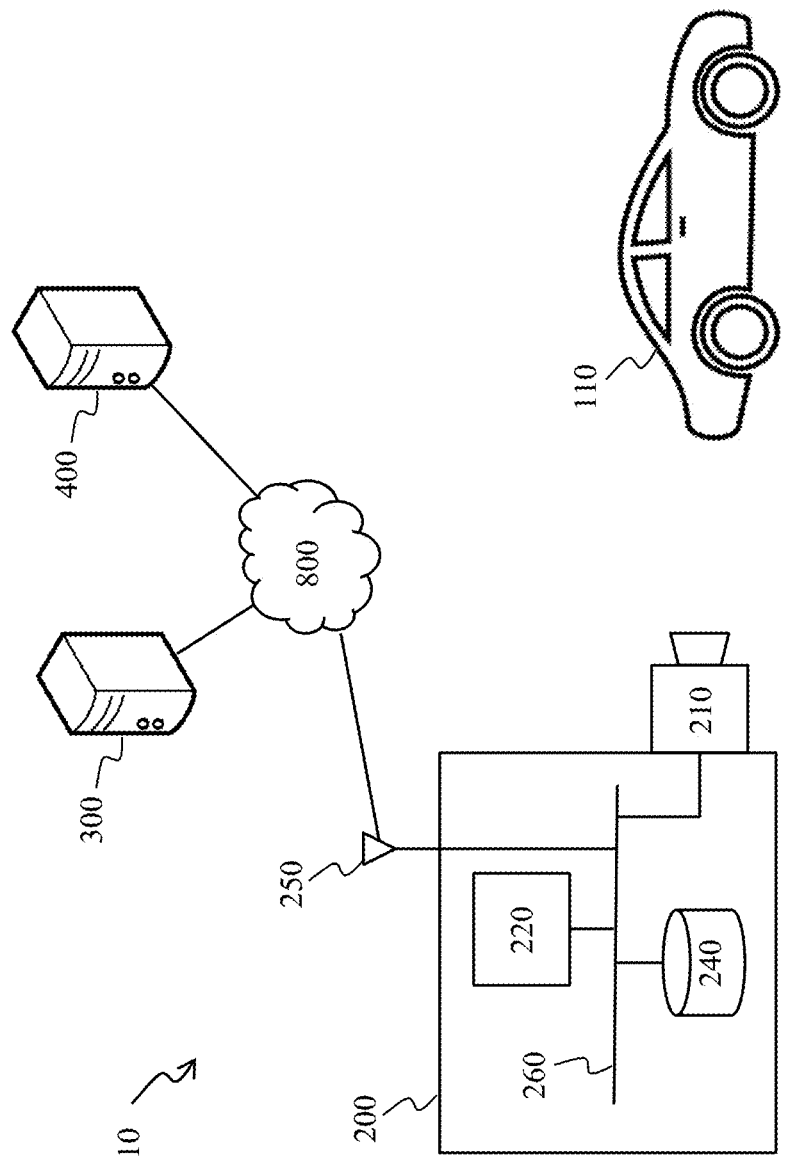
FIG. 1 illustrates an exemplary traffic monitoring system in accordance with at least one embodiment of the invention.

The above described drawing figures illustrate the present invention in at least one embodiment, which is further defined in detail in the following description. Those having ordinary skill in the art may be able to make alterations and modifications to what is described herein without departing from its spirit and scope. While the present invention is susceptible of embodiment in many different forms, there is shown in the drawings and will herein be described in detail at least one preferred embodiment of the invention with the understanding that the present disclosure is to be considered as an exemplification of the principles of the present invention, and is not intended to limit the broad aspects of the present invention to any embodiment illustrated.

In accordance with the practices of persons skilled in the art, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, code segments perform certain tasks described herein. The code segments can be stored in a processor readable medium. Examples of the processor readable mediums include an electronic circuit, a semiconductor memory device, a read-only memory (ROM), a flash memory or other non-volatile memory, a floppy diskette, a CD-ROM, an optical disk, a hard disk, etc.

In the following detailed description and corresponding figures, numerous specific details are set forth in order to provide a thorough understanding of the present invention. However, it should be appreciated that the invention may be practiced without such specific details. Additionally, well-known methods, procedures, components, and circuits have not been described in detail.

The present invention generally relates to traffic monitoring systems and methods, and more particularly to such systems and methods for reducing the processing load at the surveillance device, while maintaining information extraction accuracy.

FIG. 1 is a schematic representation of a traffic monitoring system 10 in accordance with one or more aspects of the invention.

As shown in FIG. 1, the traffic monitoring system 10 comprises one or more traffic sensors 200 communicatively coupled to a system server 300, via a network 800. In general, the traffic monitoring system 10 enables the collection of traffic related data for transmission to a third-party server 400, via the network 800. The traffic related data includes one or more characteristics of passing vehicles, such as, for example, vehicle type, class, make, model, color, year, drive type (e.g., electric, hybrid, etc.), license plate number, registration, trajectory, speed, location, etc., or any combination thereof.

Each traffic sensor 200 comprises an imaging device 210, a controller 220, a memory 240, and a transceiver 250, each communicatively coupled to a data bus 260 that enables data communication between the respective components.

The imaging device 210 is configured to capture images of traffic, in particular, video images of vehicles 110 making up the traffic, and generates video data therefrom. The imaging device 210 may be a video camera of any camera type, which captures video images suitable for computerized image recognition of objects within the captured images. For example, the camera may utilize charge-coupled-device (CCD), complementary metal-oxide-semiconductor (CMOS) and/or other imaging technology, to capture standard, night-vision, infrared, and/or other types of images, having predetermined resolution, contrast, color depth, and/or other image characteristics. The video data may be timestamped so as to indicate the date and time of recording.

The controller 220 is configured to control the operation of the other components of the imaging device 210 in accordance with the functionalities described herein. The controller may be one or more processors programmed to carry out the described functionalities in accordance software stored in the memory 240. Each processor may be a standard processor, such as a central processing unit (CPU), graphics processing unit (GPU), or a dedicated processor, such as an application-specific integrated circuit (ASIC) or field programmable gate array (FPGA), or portion thereof.

The memory 240 stores software and data that can be accessed by the processor(s), and includes both transient and persistent storage. The transient storage is configured to temporarily store data being processed or otherwise acted on by other components, and may include a data cache, RAM or other transient storage types. The persistent storage is configured to store software and data until deleted.

The transceiver 250 communicatively couples the traffic sensor 200 to the network 800 so as to enable data transmission therewith. The network 800 may be any type of network, wired or wireless, configured to facilitate the communication and transmission of data, instructions, etc., and may include a local area network (LAN) (e.g., Ethernet or other IEEE 802.03 LAN technologies), Wi-Fi (e.g., IEEE 802.11 standards, wide area network (WAN), virtual private network (VPN), global area network (GAN)), a cellular network, or any other type of network or combination thereof.

The system server 300 is generally configured to provide centralized support for the traffic sensors 200. The system server 300 is configured to receive, store and/or process traffic sensor generated data, from each of the traffic sensors 200. In particular, the system server 300 is a server of a traffic monitoring service.

The third-party server 400 is generally configured to send and receive data from the system server 300. The third-party server may be one or more servers of law-enforcement (e.g., police, highway patrol, sheriff, etc.), civil service (e.g., department of transportation, municipality, etc.) and private (e.g., trucking, security, etc.) entities.

In general, each server many include one or more server computers connected to the network 800. Each server computer may include computer components, including one or more processors, memories, displays and interfaces, and may also include software instructions and data for executing the functions of the server described herein. The servers may also include one or more storage devices configured to store large quantities of data and/or information, and may further include one or more databases. For example, the storage device may be a collection of storage components, or a mixed collection of storage components, such as ROM, RAM, hard-drives, solid-state drives, removable drives, network storage, virtual memory, cache, registers, etc., configured so that the server computers may access it. The storage components may also support one or more databases for the storage of data therein.

Figure 2:
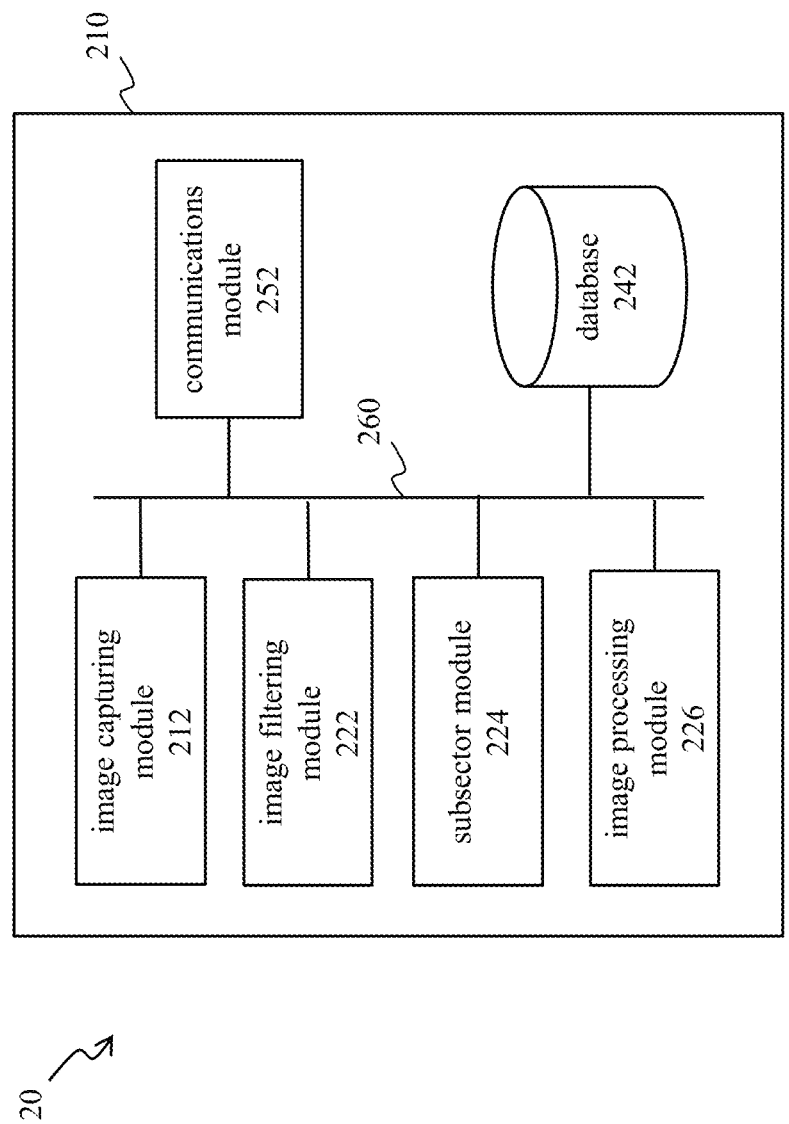
FIG. 2 illustrates an exemplary architecture of the traffic monitoring system in accordance with at least one embodiment of the invention.

FIG. 2 is a schematic representation of an exemplary architecture 20 of the traffic sensor 210 in accordance with one or more aspects of the invention. The architecture includes an image capturing module 212, an image filtering module 222, a subsector identification module 224, an image processing module 226, a communications module 252, and a database 242, communicatively coupled via the data bus 260. Each of the modules may be implemented via appropriate hardware and/or software, namely, as controller data processing and/or control of appropriate hardware components of the traffic sensor 210.

The image capturing module 212 is configured to capture, via the imaging device 210, images of traffic, namely, video images of vehicles 110 making up the traffic, and generates video data therefrom. The video data is generally a series of time-sequenced image frames, and may be timestamped so as to indicate the date and time of recording.

Figure 3:
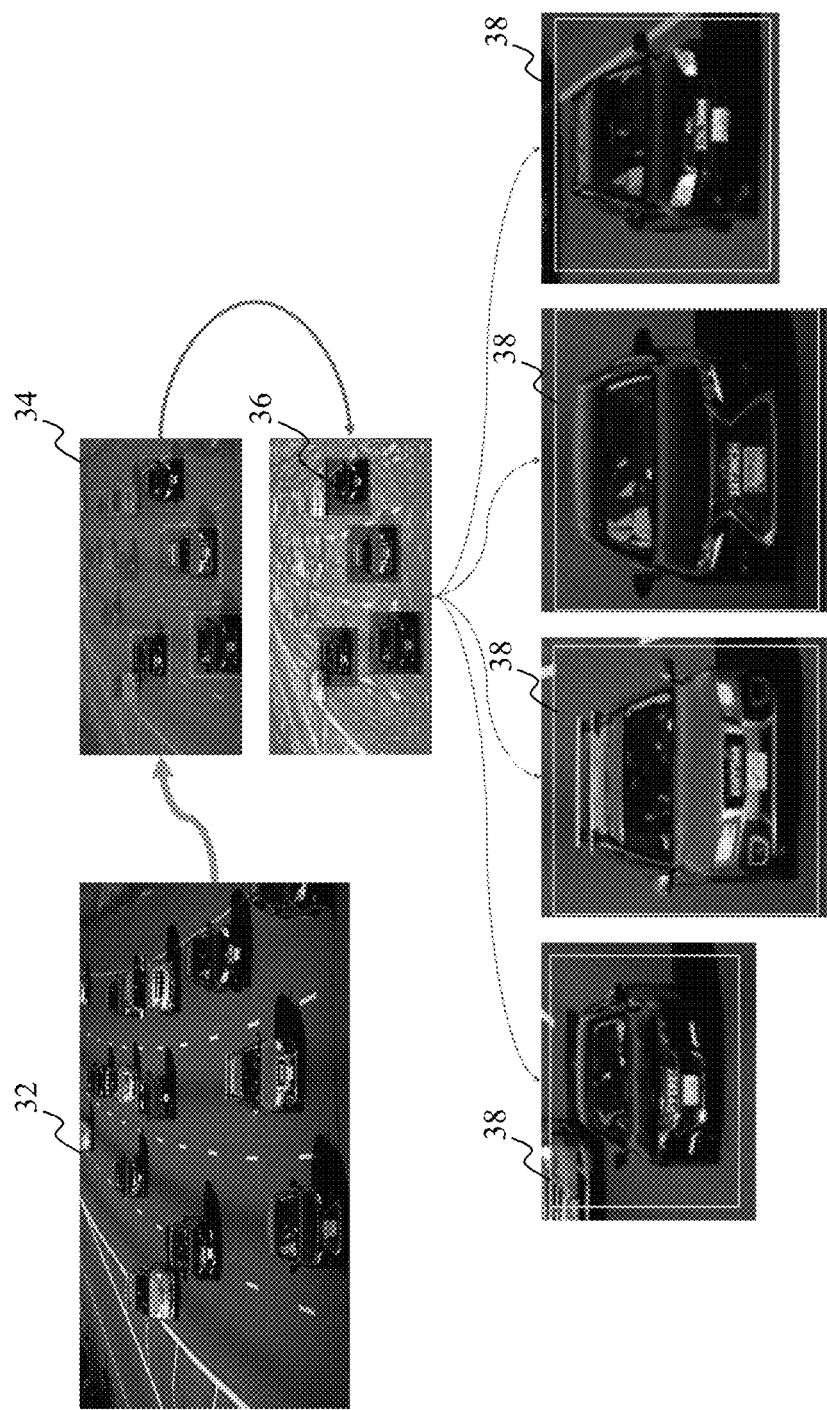
FIG. 3 illustrates image recognition aspects of the traffic monitoring system in accordance with at least one embodiment of the invention.

Referring now to FIGS. 2 and 3, the video data generated by the image capturing module 212 is full quality video data 32. In other words, the video data is of high-resolution and reflects the full field of view of the imaging device 210.

The image capturing module 212 is configured to communicate the full quality video data 32 to the database 242 for storage therein. The image capturing module 212 is also configured to communicate the full quality video data 32 to the image filtering module 222 for further processing.

The image filtering module 222 is configured to convert the full quality video data 32 to reduced quality video data 34. In particular, the image filtering module 222 reduces the resolution of the video data. The image filtering module 22 preferably reduces the resolution so as to render the reduced quality video data 34 insufficient for image recognition processing to identify specific vehicle characteristics, such as license plate number.

The subsector identification module 224 processes the reduced quality video data 34 to define one or more image subsectors 36. The image subsectors 36 are localized areas of image frames in which objects-of-interest are identified. The objects-of-interest may include, for example, vehicles and/or license plates, and the corresponding image subsectors may be respective localized areas around the vehicle and/or license plate. One or more sub sectors 36 may be defined for each image frame.

In identifying the subsectors 36, the subsector identification module 224 may apply computerized image recognition techniques to the reduced quality video 34 so as to identify the objects-of-interest within the image frames. The image recognition processing of the reduced quality video data 34 may merely identify the presence and general type of object (e.g., a vehicle, a license plate, etc.). In some embodiments, the reduced resolution video data 34 is such that it is insufficient for image recognition processing to identify additional details (e.g., license plate number or other vehicle characteristics).

The subsector identification module 224 generates sub-sector data for each image, which subsector data identifies the associated image, as well as the location, size and shape of the image subsector 36. In at least one embodiment, the subsector data defines the image pixel area containing object-of-interest, and includes the timestamp of the associated image. The subsectors 36 are preferably sized and shaped to minimize the amount of extraneous image area around the object-of-interest. The subsectors 36 are also preferably sized and shaped to minimize processing requirements, and therefore preferably adhere to simple geometries like rectangles.

The subsector identification module 224 is further configured to communicate the sub sector data to the image processing module 226.

The image processing module 226 is configured to receive the subsector data and to retrieve the corresponding full quality video data 32 from the database 242 for additional image recognition processing, based on the subsector data. In particular, the additional image recognition processing is performed for corresponding subsectors 38 of the full quality video data.

In at least one embodiment, the image processing module 226 identifies the appropriate full quality video data 32, stored in the database, via the corresponding timestamp of the reduced quality video data 34, which is included in the subsector data. The corresponding subsectors 38 are determined via reference to the location, size and shape of the image pixel area.

The image processing module 226 preferably applies computerized image recognition techniques to the full quality video 32 only in the limited image area of the corresponding subsectors 38. In other words, no additional image recognition processing is done for the image areas outside the corresponding subsectors 38. The additional image recognition processing is such that it identifies captured vehicle characteristics that were not identified by the subsector identification module 224. These additional vehicle characteristics may include, for example, vehicle type, class, make, model, color, year, drive type (e.g., electric, hybrid, etc.), license plate number, registration, trajectory, speed, location, etc., or any combination thereof. In particular, the image processing module 226 is configured to identify the captured license plate number.

In at least one embodiment, the image processing module 226 is also configured to generate a recognition record for each vehicle whose image was captured by the imaging device 110. The recognition record is preferably a dataset of the image recognized vehicle characteristic values, i.e., characteristic data. For example, the characteristic data for the license plate number is the image recognized license plate number.

In at least one embodiment, the recognition record is at least the license plate number. However, the recognition record can include any subset of the characteristic data. In at least one embodiment, the recognition record may also include the timestamp of the associated video data from which the recognition record is generated, and one or more images of the vehicle and/or the license plate. The recognition record is preferably in the form of a data object whose value is the license plate number, and whose metadata reflects the remainder of the characteristic values, if any.

The recognition record may be retrievably stored in the database 242 of the memory 240 and/or is transmitted to the system server 300 via the communications module 252 operating the transceiver 250. In particular, the recognition record may be transmitted to the system server 300 for comparison with one or more hot lists. The hot lists may be provided to the system server from the third-party servers 400, and may identify one or more vehicles-of-interest to the third-parties (e.g., law enforcement).

In the event the recognition record corresponds to a listed vehicle-of-interest, the system server 300 may request additional data from the traffic sensor 200. The additional data may include the full quality video data stored in the database 242. The communications module 252 may, in response to the request, retrieve the additional data from the database 242 and transmit the additional data to the system server 300.

Figure 4:
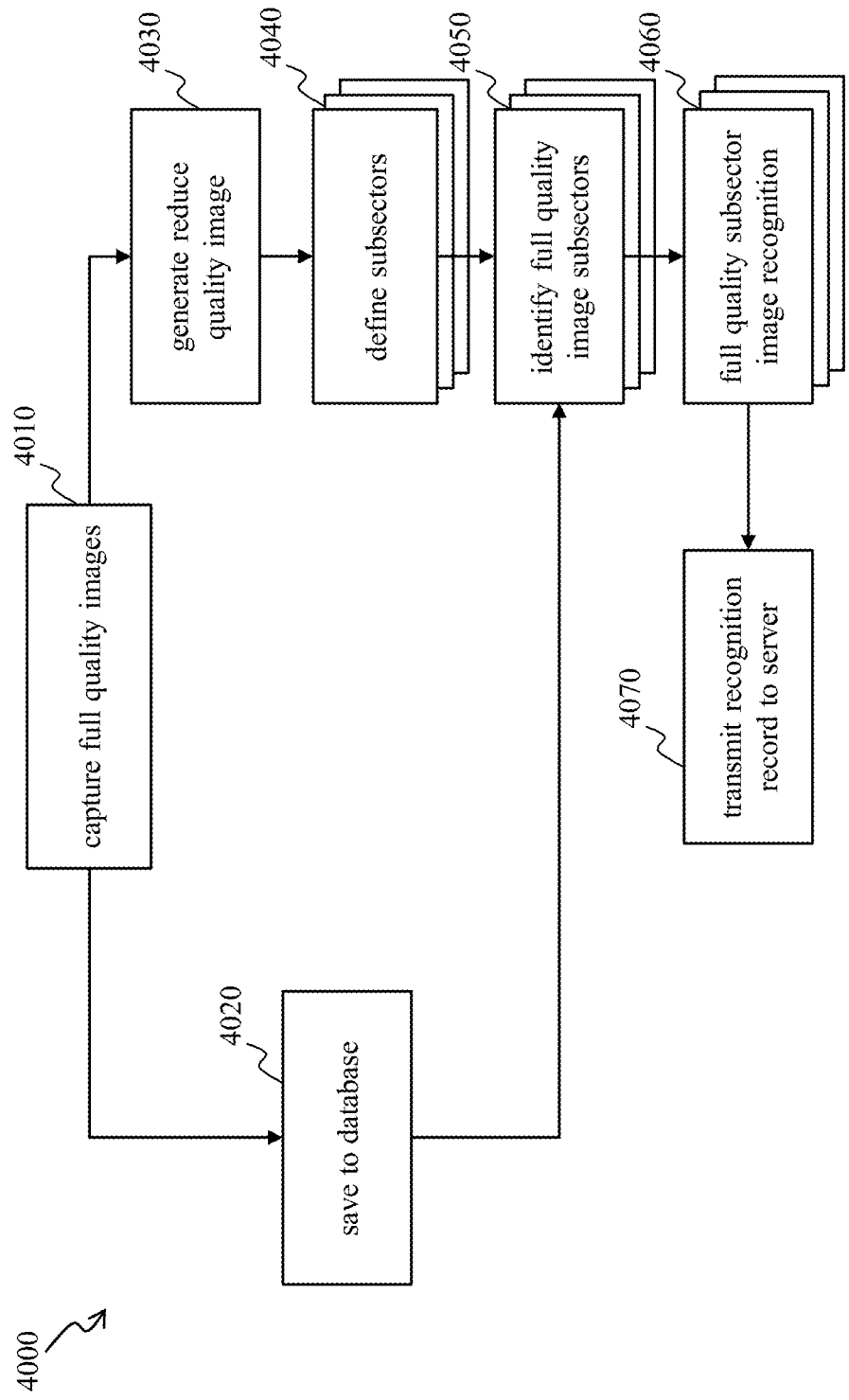
FIG. 4 illustrates an exemplary method for traffic monitoring in accordance with at least one embodiment of the invention.

FIG. 4 is a flow-chart representing an exemplary method 4000 in accordance with one or more aspects of the invention.

At step 4010, the image capturing module 212 captures images of traffic, namely, video images of vehicles 110 making up the traffic, and generates video data therefrom. The video data is generally a series of time-sequenced image frames, and may be timestamped so as to indicate the date and time of recording. The video data generated by the image capturing module 212 is full quality video data 32. The full resolution video data is saved to the database 242 at step 4120.

At step 4030, the image filtering module 222 converts the full quality video data to reduced quality video data 34. In particular, the image filtering module 222 reduces the resolution of the video data such that the reduced quality video data 34 is a lower resolution version of the video data. It will be understood that other quality reductions can also be applied, e.g., color to black-and-white, etc. The objective of the quality reduction is to minimize the processing power used to identify objects-of-interest.

At step 4040, the subsector identification module 224 processes the reduced quality video data to define one or more image subsectors 36, and generates subsector data for each image. The image subsectors are localized areas of image frames in which objects-of-interest (e.g., vehicles and/or license plates) are identified. The subsector data identifies the associated image, as well as the location, size and shape of the image subsector.

At step 4050, the image processing module 226, based on the subsector data, retrieves the corresponding full quality video data from the database 242, and identifies the corresponding subsectors in the full quality images. The image processing module 226 identifies the appropriate full quality video data, stored in the database, via the corresponding timestamp of the reduced quality video data, which is included in the subsector data. The corresponding subsectors are determined via reference to the location, size and shape of the subsector.

At step 4060, the image processing module 226 applies additional image recognition processing to the full quality video subsectors to generate one or more recognition records. The additional image recognition processing is such that it identifies captured vehicle characteristics that were not identified by the subsector identification module 224.

The recognition record is preferably a dataset of the image recognized vehicle characteristic values, i.e., characteristic data. For example, the characteristic data for the license plate number is the image recognized license plate number. The additional vehicle characteristics may include, for example, vehicle type, class, make, model, color, year, drive type (e.g., electric, hybrid, etc.), license plate number, registration, trajectory, speed, location, etc., or any combination thereof. In particular, the image processing module 226 is configured to identify the captured license plate number.

The recognition records are thus generated based on the image recognition of the subsectors, rather than the entire fully quality video. This reduces the processing power required to generate the recognition records.

At step 4070, the recognition record is retrievably stored in the database 242 of the memory 240 and/or is transmitted to the system server 300 via the communications module 252 operating the transceiver 250.

In particular, the recognition record may be transmitted to the system server 300 for comparison with one or more hot lists. The hot lists may be provided to the system server from the third-party servers 400, and may identify one or more vehicles-of-interest to the third-parties (e.g., law enforcement). In the event the recognition record corresponds to a listed vehicle-of-interest, the system server 300 may request additional data from the traffic sensor 200. The additional data may include the full quality video data stored in the database 242. The communications module 252 may, in response to the request, retrieve the additional data from the database 242 and transmit the additional data to the system server 300.

The embodiments described in detail above are considered novel over the prior art and are considered critical to the operation of at least one aspect of the described systems, methods and/or apparatuses, and to the achievement of the above described objectives. The words used in this specification to describe the instant embodiments are to be understood not only in the sense of their commonly used meanings, but to include by special definition in this specification: structure, material or acts beyond the scope of the commonly defined meanings. Thus, if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense, it is therefore contemplated that an equivalent substitution of two or more elements may be made for any one of the elements described and its various embodiments or that a single element may be substituted for two or more elements.

Changes from the subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

Furthermore, the functionalities described herein may be implemented via hardware, software, firmware or any combination thereof, unless expressly indicated otherwise. If implemented in software, the functionalities may be stored in a memory as one or more instructions on a computer readable medium, including any available media accessible by a computer that can be used to store desired program code in the form of instructions, data structures or the like. Thus, certain aspects may comprise a computer program product for performing the operations presented herein, such computer program product comprising a computer readable medium having instructions stored thereon, the instructions being executable by one or more processors to perform the operations described herein. It will be appreciated that software or instructions may also be transmitted over a transmission medium as is known in the art. Further, modules and/or other appropriate means for performing the operations described herein may be utilized in implementing the functionalities described herein.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A surveillance device, comprising:
    an imaging unit configured generate full-quality image data from a captured image of a vehicle;
    an image filtering module configured to convert the full-quality image data to reduced-quality image data;
    a subsector module configured to process the reduced-quality image data, via image recognition processing, so as to identify an object-of-interest in the captured image as one of among: a vehicle and a license plate, and to thereby generate subsector data defining one or more subsectors of the captured image according to simple geometrics containing the identified object-of-interest; and
    an image processing module configured to identify one or more specific vehicle characteristics within the one or more subsectors by applying additional image recognition processing on the full-quality image data only within the one or more subsectors, wherein the reduced quality image data is insufficient for the image recognition processing to identify the specific vehicle characteristics therefrom.

2. The surveillance device of claim 1, wherein the image processing module is further configured to generate a recognition record that includes at least one of the identified one or more specific vehicle characteristics.

3. The surveillance device of claim 1, wherein the one or more specific vehicle characteristics is a license plate number.

4. The surveillance device of claim 1, wherein the specific vehicle characteristics includes one or more of: vehicle type, class, make, model, color, year, drive type, license plate number, registration, trajectory, speed and location.

5. The surveillance device of claim 1, wherein the one or more subsectors correspond to localized areas of the captured image where the presence of objects-of-interest are identified.

6. The surveillance device of claim 5, wherein the one or more subsectors are sized and shaped to minimize image processing requirements on the corresponding full-quality image data.

7. The surveillance device of claim 5, wherein the subsector data includes at least one pixel area of the captured image, and a timestamp of the captured image.

8. The surveillance device of claim 1, wherein the full-quality image data greater in at least one of: resolution, contrast and color depth, than the reduced-quality image data.

9. A surveillance method, comprising:
generating full-quality image data from an image of a vehicle captured by an imaging unit;
converting the full-quality image data to reduced-quality image data;
processing the reduced-quality image data, via image recognition processing, so as to identify an object-of-interest in the captured image as one of among: a vehicle and a license plate, and to thereby generate subsector data defining one or more subsectors of the captured image according to simple geometrics containing the identified object-of-interest; and
identifying one or more specific vehicle characteristics within the one or more subsectors by applying additional image recognition processing on the full-quality image data only within the one or more subsectors, wherein the reduced-quality image data is insufficient for the image recognition processing to identify the specific vehicle characteristics therefrom.

10. The surveillance method of claim 9, wherein the image processing module is further configured to generate a recognition record that includes at least one of the identified one or more specific vehicle characteristics.

11. The surveillance method of claim 9, wherein the one or more specific vehicle characteristics is a license plate number.

12. The surveillance method of claim 9, wherein the specific vehicle characteristics includes one or more of: vehicle type, class, make, model, color, year, drive type, license plate number, registration, trajectory, speed and location.

13. The surveillance method of claim 9, wherein the one or more subsectors correspond to localized areas of the captured image where the presence of objects-of-interest are identified.

14. The surveillance method of claim 13, wherein the one or more subsectors are sized and shaped to minimize image processing requirements on the corresponding full-quality image data.

15. The surveillance method of claim 13, wherein the subsector data includes at least one pixel area of the captured image, and a timestamp of the captured image.

16. The surveillance method of claim 9, wherein the full-quality image data greater in at least one of: resolution, contrast and color depth, than the reduced-quality image data.

17. An image processing method, comprising:
generating full-quality image data from a captured image of an object;
converting the full-quality image data to reduced-quality image data;
processing the reduced-quality image data, via image recognition processing, so as to identify an object-of-interest in the captured image as one of among: a vehicle and a license plate, and to thereby generate subsector data defining one or more subsectors of the captured image according to simple geometrics containing the identified object-of-interest; and
identifying one or more specific object characteristics within the one or more subsectors by applying additional image recognition processing on the full-quality image data only within the one or more subsectors, wherein the reduced-quality image data is insufficient for the image recognition processing to identify the specific object characteristics therefrom.

18. The image processing method of claim 17, wherein the one or more subsectors correspond to localized areas of the captured image where the presence of features-of-interest are identified.

19. The image processing method of claim 18, wherein the one or more subsectors are sized and shaped to minimize image processing requirements on the corresponding full-quality image data.

20. The image processing method of claim 17, wherein the full-quality image data greater in at least one of: resolution, contrast and color depth, than the reduced-quality image data.

* * * * *